Aug. 15, 1967           A. SCHREIBER           3,336,016

APPARATUS FOR AERATING SEWAGE IN AN AERATING TANK

Filed Aug. 9, 1965

INVENTOR.
August Schreiber
BY
Watson Cole Grindle & Watson
Attys.

3,336,016
APPARATUS FOR AERATING SEWAGE IN AN AERATING TANK
August Schreiber, 45A Bahnhofstrasse, Hanover-Vinnhorst, Germany
Filed Aug. 9, 1965, Ser. No. 478,044
Claims priority, application Germany, Nov. 26, 1964, Sch 36,169
11 Claims. (Cl. 261—123)

This invention concerns a method of and apparatus for aerating sewage in an aerating tank, in which the sewage, which is mixed with activated sludge, is subjected to a horizontally circulating flow.

In conventional apparatus for the purification of sewage with activated sludge, which operate with the blowing-in of air, the compressed air introduced below into the mixture of activated sludge and water brings about a vertical flow of the liquid in the region of the ascending air bubbles. The period of time during which the air bubbles remain in the activated sludge mixture is very short, since not only are the air bubbles rising at their own speed of ascent in a non-moved liquid, but the speed of ascent of the activated sludge mixture which is brought about by the aeration also shortens the time of dwell in the activated sludge mixture.

In addition, the air bubbles in rising vertically upwards are in contact with increasingly saturated sludge-water mixture, so that the oxygen deficit and therefore the oxygen absorption become increasingly less towards the surface.

These disadvantages are reduced by the aeration of a flowing activated sludge mixture. It is known to impart a horizontal flow to the aerated sewage by special means. Paddles, wheels, propellers, Kessner brushes, tangential inlet and outlet pipes into and from the aerating basin, have all been used for this purpose. These methods and the apparatus required for them involves additional outlay on manufacture and during operation.

An object of the invention is to lengthen the time of dwell of the air introduced into the sewage which is to be purified, and to achieve an intensive horizontal movement and mixing of the sewage-sludge mixture in the aerating tank, without requiring expensive additional means for the purpose.

In a known apparatus for the purification of sewage with activated sludge, compressed air is introduced through a plurality of riser pipes widening fanwise at the top, somewhat below the surface level of the liquid and transversely to the longitudinal axis of the tank, in a horizontal direction, the liquid into which the said air is introduced being situated in an elongated aerating tank. Owing to the compressed air introduced into the liquid, the upper layer of the liquid is subjected to a flow which proceeds horizontally transversely to the longitudinal axis of the tank and which at the opposite side wall is deflected by a deflecting surface in a downward direction and finally at the bottom of the tank in a direction which is oppositely to the direction of the liquid flow below the surface of the liquid. The compressed air is in contact with the liquid circulating in vertical section planes only over a distance the length of which corresponds approximately to the short transverse axis of the aerating tank.

An apparatus for the purification of sewage with activated sludge is also known wherein air is introduced into the liquid circulating in an annular container through a brush roller which rotates about a horizontal axis and is partly immersed in the liquid. Here, the introduction of air can be effected only a short distance below the surface of the liquid, so that it is not possible to obtain any considerable time of dwell for the air in the liquid.

Finally, an aerating apparatus for sewage is known wherein the sewage, circulating in a vertical section plane, is aerated through immersion tubes from the lower end of which the air issues.

In contradistinction thereto, the invention relates to the aerating of sewage which circulates in a horizontal sense in an aerating tank.

The invention has as its object, in the aerating of sewage in an aerating tank in which a horizontally circulating flow is imposed on the sewage, with which activated sludge is mixed, to economise in energy and to obtain a longer time of dwell for the air bubbles in the sewage. This is to be achieved by making the introduction of air serve at the same time as driving means for the horizontal circulating flow, whereby the air bubbles are obliged to remain longer in the sewage than hitherto, which results in better utilisation of the oxygen content of the air bubbles.

For this purpose the invention provides a method of aerating sewage in an aerating tank, wherein sewage is mixed with activated sludge and a horiontally circulating flow is imparted to the sewage-sludge mixture, and wherein from the region of the tank floor the sewage-sludge mixture is inspired with simultaneous aeration in the direction of flow of the sewage and is introduced again into the sewage flow in the same direction below the surface of the liquid and in the region of the said surface.

The bubbles of the aerating air ascend obliquely upwards so that they spend a long time in the activated sludge mixture and impart a horizontal flow to the said mixture and are mixed quickly and intensively with the remainder of the tank contents.

The invention also provides apparatus for carrying out the aforesaid method, the apparatus comprising an aerating tank, and aerating means including air inlet tubes disposed in said tank for immersion in sewage, said tubes having at the lower ends thereof outlet apertures from which air can issue, and guide walls disposed in the region of said inlet tubes, said guide walls being inclined for deflecting the sewage-sludge mixture during aeration, in the direction of flow of the sewage.

With this arrangement, air can be forced into the activated sludge and sewage mixture below the air outlet apertures of the aerating tubes, so that the air bubbles owing to their ascending action inspire mixture also to flow vertically upwards with the air bubbles. By providing a lower guide wall below the air outlet apertures, the suction effect cannot be continued vertically downwards but can act only in a lateral sense, and a considerable proportion of the ascending liquid is inspired from a horizontal direction. Owing to the inertia of the liquid, the said liquid does not flow vertically upwards but remains in the direction of flow in which it was inspired. As a result, the ascending air bubbles are deflected from the vertical direction.

However, the guide walls may also be arranged above the air outlet apertures. In this case the ascending flow of liquid is deflected by these guide walls and in this way the kinetic energy imparted to the ascending liquid is deflected horizontally so that the tank contents are given a movement in a horizontal sense. The vertically ascending air bubbles are entrained by the water flow. They do not combine below the upper guide wall to form relatively large air cushions and flow to the surface at the highest point of the upper guide wall, and instead the ascending air bubbles are taken past this guide wall by the flow of liquid without contacting the said wall. If desired, both lower and upper guide walls may be provided.

It is convenient for the edges of the guide walls which are situated transversely to the direction of flow to be provided with profiling, e.g., recesses, so that an easy transition between vertical and horizontal flow is achieved.

For strengthening the horizontal flow, the upper guide walls may be prolonged downwardly and the lower guide walls may be prolonged upwardly, each upper guide wall being arranged spaced from the lower guide wall to form a slot of S-shaped cross-section.

A further improvement can be achieved if the extended guide walls are connected to one another by side walls to form an S-shaped duct. Since friction losses are reduced by the guide surfaces bounding the flow on all sides, greater forces are released which promote the horizontal movement.

In accordance with one form of embodiment of the aerating tank is round and the aerating means are arranged distributed over the diameter of the tank.

In accordance with another form of embodiment, the aerating tank is elongated and the aerating means are arranged with guide walls in the vicinity of the longitudinal walls of the tank, and in fact acting towards the interior of the tank at an inclination to the side walls.

According to a development of this form of embodiment, a central wall is arranged in the elongated tank parallel to the longitudinal walls thereof, the ends of the central wall being spaced from the end walls of the tank. The central wall may be provided with perforations if necessary. Between the ends of said central wall and the end walls of the tank there are provided further aerating means with guide walls, the said further aerating means acting at an inclination or tangentially to the said end walls.

In the case of an elongated aerating tank, the aerating means with guide walls may be arranged substantially on the centre line of the tank so as to act obliquely with respect to the longitudinal walls. Aerating means can be arranged in the central region of the tank so as to be effective alternately to one side and the other side of the tank, and aerating means can be arranged in the two end regions adjacent the end walls of the tank to act towards one side in each case, the aerating means in one end region acting in a direction opposite to the direction of action of the aerating means in the other end region.

The offset arrangement of the aerating means with their guide walls causes the contents of the tank to be mixed very quickly and thoroughly.

A particular advantage of the aerating means according to the invention consists in that the ascending air bubbles always come into contact with new quantities of liquid and are washed thereby, and that the oxygen deficit is greater than if liquid is aerated as early as in the lower region of the tank, moves upwards and is further traversed by air bubbles. In this way the invention provides the necessary conditions for a satisfactory action of the activated sludge tank, namely good oxygen extraction and good mixing of the tank contents, and therefore a satisfactory purifying action.

For a better understanding of the invention and to show how it may be carried into effect, forms of embodiment thereof will now be described by way of example, with reference to the accompanying diagrammatic drawings, in which:

FIGURES 1, 3 and 5 each show an aerating apparatus with lower and upper guide walls, in a sectional view transversely to the air distributor tube;

FIGURES 2, 4 and 6 each show a section taken on the line II—II, IV—IV and VI—VI of FIGURES 1, 3 and 5 respectively in the direction of the arrows and;

Figure 8:
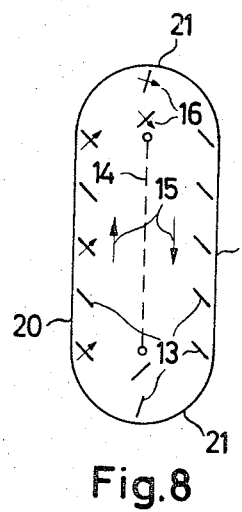
FIGURE 8 shows a plan view of an elongated activated sludge tank.

FIGUE 9 is a plan view showing a form of embodiment modified relatively to that shown in FIGURE 8.

In FIGURES 1 to 6, the reference 1 designates an air inlet tube, 2 an air distributor formed with air outlet apertures, 3 a lower guide wall, 4 an upper guide wall, 5 ascending air bubbles, 6 the tank floor and 7 the surface of the liquid.

Figure 1:
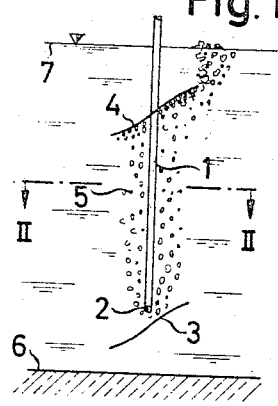
Figure 3:
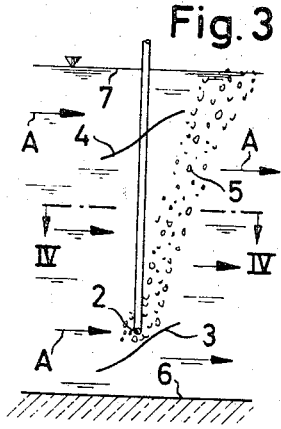
Figure 2:
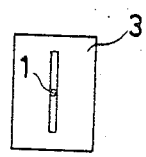
Figure 4:
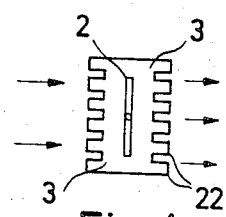

FIGURE 1 shows the air bubblies 5 as they would ascend in cases where the tank contents are stationary. FIGURE 3 shows the air bubbles 5 when the tank contents are in flowing motion. The flow direction is indicated by arrows A. In FIGURE 2 the lower guide wall 3 is not profiled. According to FIGURE 4, the lower guide is formed with indentations providing profilings 22 so that an easy transition is achieved between the vertical and horizontal flows.

Figure 5:
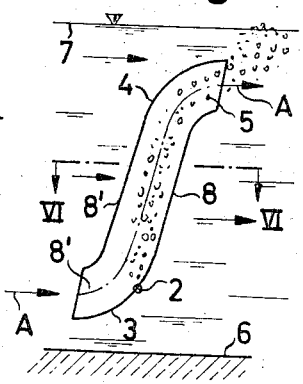
Figure 6:
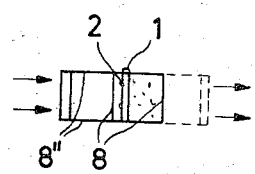

FIGURES 5 and 6 show an aerating apparatus in which not only are lower guide walls 3 and upper guide walls 4 provided, but there are also connecting walls 8 between each upper and lower guide wall, and lateral boundary walls 8', to form an S-shaped flow duct.

The form of embodiment according to FIGURES 5 and 6 is advantageously suitable in cases where a particularly effective production of horizontal flow energy is desirable.

Figure 7:
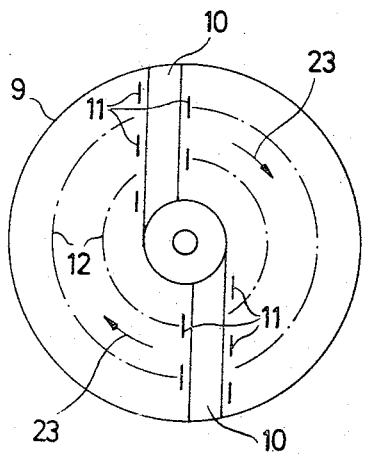
FIGURE 7 is a view from above of a circular activated sludge tank in which in addition to the aerating means for horizontal flows there are also provided additional concentric aerating means.

In the case of the circular aerating tank shown in FIGURE 7, the reference 9 designates the containing wall, 10 an operator's walk, 11 the aerating means for achieving a circulating water movement, 12 concentrically arranged aerating rings for the additional aeration of the tank contents. The circulating flow is indicated by arrows 23.

In FIGURE 8, the reference 13 designates the aerating means for producing a circulating water motion, and 14 a pervious or profiled middle wall arranged with its ends spaced from the end walls 21 of the tank and to permit the mixing of the tank contents from one side to the other. The arrows 15 indicate the circulating flow of liquid which occurs in the tank. 16 are directional arrows indicating the individual horizontal water movements within the tank. The aerating means 13 are provided both at the longitudinal walls 20 and also at the end walls 21. In this form of embodiment a circulating liquid movement occurs in the tank, in a spiral direction of flow about the middle wall 14. The aerating means can also be arranged in the middle of the tank or laterally at the central partition wall 14.

Figure 9:
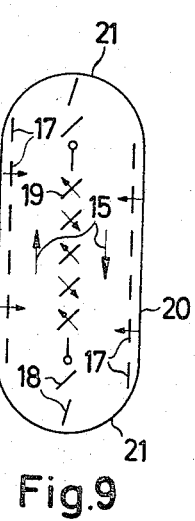

FIGURE 9 shows an elongated tank wherein the aerating means 17 are provided in hitherto known form centrally, or as illustrated, at the longitudinal walls 20, whilst approximately along the centre line there are arranged aerating means 18, 19 of the type according to the invention. The aerating means 18 are arranged in the two end regions of the tank adjacent the tank ends 21 and act towards one side in each case, the aerating means 18 in one end region acting in a direction opposite to the direction of action of the aerating means 18 in the other end region, thereby imparting a circulating movement to the entire tank contents. In the case of the aerating means 19 arranged in the central region of the tank the water flow is directed now towards the right and now towards the left, so that a thorough mixing of the tank contents and a circulating water flow within the tank are obtained.

The guide walls 3, 4 and also the extension or connecting walls 8 and the lateral boundary walls 8' if necessary, can be fixed in any suitable manner e.g., can be connected to the air inlet tubes 1.

The invention makes it possible to purify sewage with little outlay.

I claim:
1. Device for aerating mixtures of activated sludge and waste water, comprising a one-chamber aeration basin having a flat basin floor, air supply pipes dipping into a mixture of activated sludge and waste water, and terminating at a distance above the basin floor, said pipes having exit openings for the air at its lower end, and guide walls sloping in the same direction and secured out of contact with the basin floor on the air supply pipes so that, at the start of the aeration, the mixture of activated sludge and waste water will pass obliquely through rising air bubbles, and the entire contents, of the basin, not only in the vicinity of the air supply pipes and in the vicinity of the basin floor, is subjected to horizontal flow.

2. Apparatus as claimed in claim 1, wherein the guide walls are disposed below the air outlet apertures.

3. Apparatus as claimed in claim 1, wherein the guide walls are disposed above the air outlet apertures.

4. Apparatus as claimed in claim 1, wherein the guide walls are disposed below and above the air outlet apertures.

5. Apparatus as claimed in claim 1, edges of the guide walls situated transversely to the direction of flow of the sewage are provided with indentations.

6. Apparatus as claimed in claim 1, wherein the aerating tank is circular and the aerating means are distributed over the diameter of the tank.

7. Apparatus as claimed in claim 1, wherein the aerating tank is elongated and the aerating means with guide walls are arranged in the vicinity of the longitudinal walls of the tank, the aerating means being arranged to act towards the interior of the tank at an inclination to said longitudinal walls.

8. Apparatus as claimed in claim 1, wherein the aerating tank is elongated and the aerating means with guide walls are arranged in the vicinity of the longitudinal walls of the tank, the aerating means being arranged to act towards the interior of the tank at an inclination to said longitudinal walls, a central wall disposed within the tank parallel to the longitudinal walls, said central wall having its ends spaced from corresponding end walls of the tank, there being between the ends of the central wall and the tank end walls, further aerating means with guide walls which act on the tank end walls.

9. Apparatus as claimed in claim 1, wherein the aerating tank is elongated and the aerating means with guide walls are arranged in the vicinity of the longitudinal walls of the tank, the aerating means being arranged to act towards the interior of the tank at an inclination to said longitudinal walls, a central wall disposed within the tank parallel to the longitudinal walls, said central wall having its ends spaced from corresponding end walls of the tank, there being between the ends of the central wall and the tank end walls, further aerating means with guide walls which act on the tank and walls, the central wall being perforated.

10. Apparatus as claimed in claim 1, wherein the aerating tank is elongated and the aerating means with guide walls are arranged approximately on the centre line of the tank so as to act obliquely relatively to the longitudinal walls of the tank.

11. Apparatus as claimed in claim 1, wherein the aerating tank is longitudinally elongated and the aerating means with guide walls are arranged approximately on the longitudinal centre line of the tank so as to act obliquely relatively to the longitudinal walls of the tank, the aerating means being arranged in the central region of the tank to act alternately to one side and the other side of the tank, and aerating means are arranged in the two end regions adjacent the tank end walls to act in each case towards one side of the tank, the aerating means in one end region acting in a direction opposite to the direction of action of the aerating means in the other end region.

References Cited

UNITED STATES PATENTS 3,169,921  2/1965  Griffith _ _ _ _ _ _ _ _ _ _ _  210—15 X

FOREIGN PATENTS 1,282,768  12/1961  France.
568,203  1/1933  Germany.
561,395  3/1933  Germany.
729  1914  Great Britain.

MORRIS O. WOLK, *Primary Examiner.*

MICHAEL E. ROGERS, *Examiner.*